March 2, 1965 K. D. BROADBENT 3,172,089

THIN FILM MAGNETIC DEVICE

Filed June 25, 1962 4 Sheets-Sheet 1

INVENTOR.
KENT D. BROADBENT.
BY

AGENT.

INVENTOR.
KENT D. BROADBENT,
BY
E. L. Oberheim
AGENT.

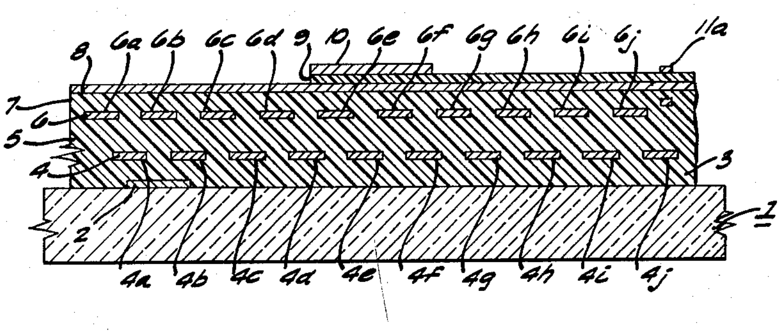
FIG. 3.
| TIME | FLIP FLOP | FLIP FLOP | "AND" GATE |
|---|---|---|---|
| T1 | Q1 | Q̄2 | A1 |
| T2 | Q̄1 | Q2 | A2 |
| T3 | Q1 | Q2 | A3 |
| T4 | Q̄1 | Q̄2 | A4 |
FIG. 7.
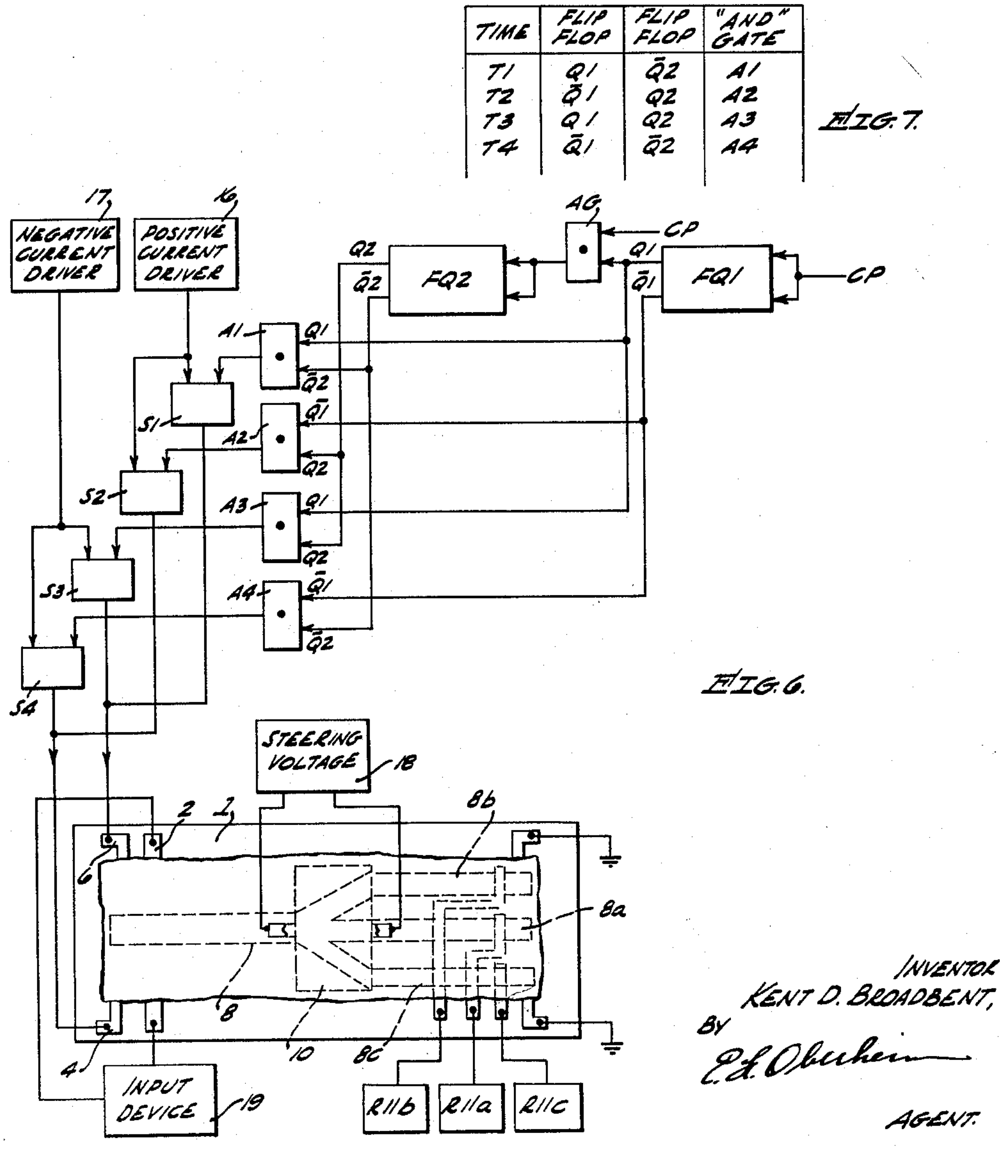
FIG. 6.
INVENTOR
KENT D. BROADBENT,
BY
E. L. Oberheim
AGENT.

March 2, 1965 K. D. BROADBENT 3,172,089

THIN FILM MAGNETIC DEVICE

Filed June 25, 1962 4 Sheets-Sheet 4

INVENTOR.
KENT D. BROADBENT,
BY E. L. Oberheim 3,172,089

THIN FILM MAGNETIC DEVICE

Kent D. Broadbent, San Pedro, Calif., assignor to Hughes Aircraft Company, Culver City, Calif., a corporation of Delaware Filed June 25, 1962, Ser. No. 204,893
8 Claims. (Cl. 340—174)

This invention relates to magnetic devices and more particularly to such devices including magnetic elements in which magnetic domains may be produced, stored and/or propagated.

Magnetic or electromagnetic devices incorporating the principle of this invention may be manufactured by vacuum deposition techniques but are not necessarily limited to such a method of fabrication. Vacuum deposition techniques permit the simultaneous formation of multiple magnetic components or devices on a substrate together with their interconnecting circuits offering a facility for the layer by layer fabrication of complete organizations having small power requirements in relatively small volumes.

A device for storing and propagating information is commonly referred to as a shift register. Shift registers have been designed using vacuum tubes, transistors, magnetic cores and other devices. All of these include discrete signal storage elements or components with circuit facilities for transferring signals from one element to the next.

Patent No. 2,919,432, Kent D. Broadbent, inventor, filed February 28, 1957, and assigned to the assignee of this invention, describes still another type of shift register.

The shift register described in the patent referred to above employs a magnetic film in which one or more magnetic domains are propagated, providing movement of the magnetized area or domain in each direction along a single path. The uses to which such a device may be put are dependent in part upon the freedom of movement of the magnetic domain. The provision of facilities in such a device affording displacement of a magnetic domain for movement along any one of several paths in selected directions extends the range of application of such a device beyond that of the device in the patent aforesaid. Such a multipath device may be used by way of illustration but not limitation as a multiposition switch or as a decision making element.

One object of this invention is to provide an improved magnetic device in which magnetic domains may be produced, propagated and steered in more than one direction.

It is also an object of this invention to provide an improved magnetic switch or decision element.

Further separate and combined objects are to provide a magnetic device of the character aforesaid which is small in size, which requires relatively little power for operation, which may be fabricated by automatic techniques, and which is compatible with solid state circuit devices, at least, such as transistors.

The aforesaid and other objects and advantages of this invention are achieved in a magnetic device including a magnetic medium, such as a thin magnetic film of a material preferably exhibiting a square loop magnetic hysteresis characteristic and magnetically oriented to provide an "easy direction" of magnetization. The magnetic film is linked by at least one "write" electrode which when energized produces a magnetic domain in the magnetic film. This magnetic domain is poled in correspondence with the easy direction of magnetization of the magnetic film. Propagating electrodes link the magnetic film. These are physically oriented with the magnetic film and selectively energized in such a way as to step or displace the magnetic domain along a line of propagation paralleling the easy direction of magnetization. This line of propagation is herein referred to as the normal line, or the normal direction, of propagation. One or more steering electrodes, or other magnetic field producing devices produce magnetic fields linking the magnetic film and acting at an angle with respect to the magnetic fields produced by the propagating electrodes to effect magnetic domain displacement in the magnetic film in a direction different from the direction of normal propagation if energized at the time of, or during, energization of a propagating electrode.

The magnetic film may be sufficiently wide to permit lateral displacement of a magnetic domain within its boundaries providing movement of the magnetic domain along differing paths in the magnetic film. The magnetic film may also be a strip having one or more branch strips along its length or having several branches at a common junction, any of which may be chosen as the path of propagation of a magnetic domain. In these respects the magnetic device may be regarded as a magnetic switch or decision element.

A read out electrode may be disposed in flux linkage with the magnetic film along the normal line of propagation of a magnetic domain to magnetically sense a magnetic domain. Several such electrodes may be employed if desired to "read" magnetic domains at different points along the normal line of propagation. If a single magnetic film is employed the read out electrodes may extend completely across the magnetic film, or only part way across, to sense magnetic domains in a particular path or paths. If a film having branches is employed, separate read out electrodes in the respective branches may be employed.

The read out electrode or electrodes may be of any suitable type, such as a conductor, disposed to be linked by the magneto field of a domain, a magnetic resistive type, etc., capable of sensing or responding to the presence of a magnetic domain in the region of the read out electrode.

In all applications aforesaid the propagating electrodes may extend completely across the magnetic film and, as will be seen, are of a width compatible with the dimension lengthwise of a magnetic zone measured in the direction of propagation of the zone.

If a magnetic film is employed which has a width greater than the desired width of a zone the "write" electrode or electrodes may be of a width to create the desired width of zone in a desired transverse position on the magnetic film. If the "write" electrode, as a matter of manufacturing convenience, is to extend completely across such a wide film, selected portions of the "write" electrode may be shielded from the film to limit creation of a magnetic domain or domains only adjacent unshielded portions of the "write" electrode.

Other objects and advantages of this invention will become apparent from a study of the following specification when considered in conjunction with the accompanying drawings in which:

FIG. 3 is a longitudinal sectional view of the embodiment of the invention illustrated in FIG. 1;

Figure 1:
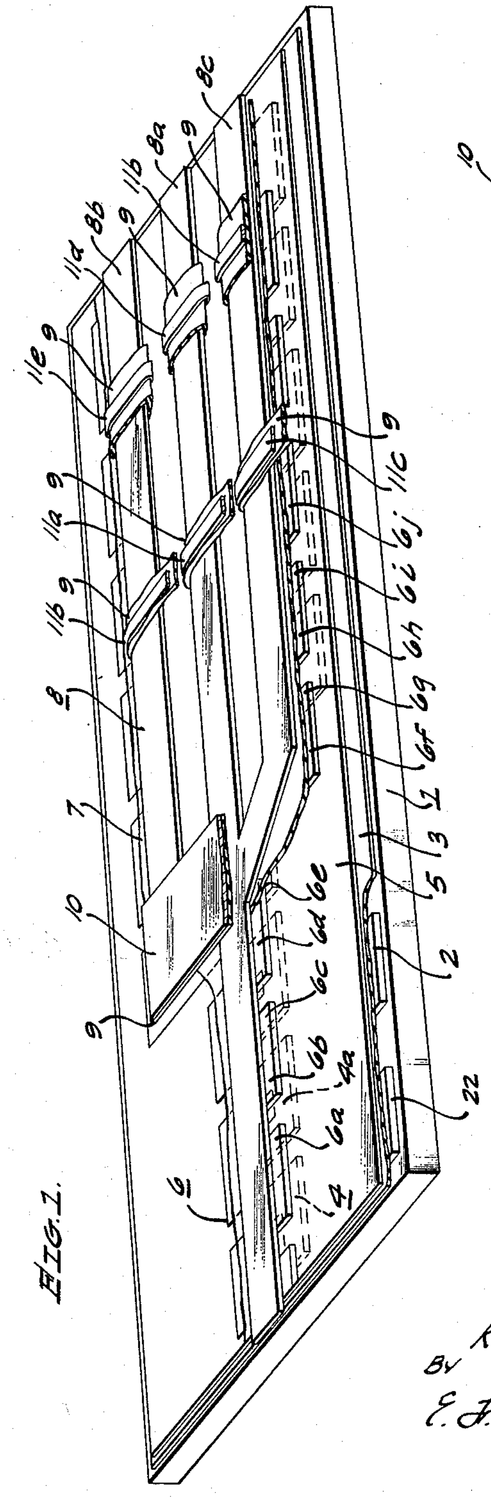
FIGURE 1 is an isometric view illustrating one embodiment of this invention.
Figure 5:
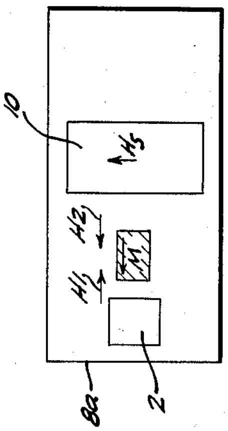

FIGS. 4*a* through 4*j* are identical schematic, cross-sectional representations of the embodiment of this invention in FIG. 1 showing various stages of propagation of a magnetic domain along the normal line of propagation in the magnetic film;

FIG. 5 illustrates another embodiment of this invention;

FIG. 6 is a circuit diagram representing an application of the subject matter of this invention; and FIG. 7 is a timing chart for the circuit of FIG. 5.

In describing this invention certain theoretical concepts are set forth. These theoretical discussions represent presently preferred plausible explanations of the magnetic phenomena involved in the apparatus of this invention. It is to be appreciated, however, that other and different equally plausible explanations of the phenomena involved herein may be advanced. Accordingly, it is to be understood that the applicant does not wish to be limited to any particular theory of operation.

This invention combines a magnetic shift register of the type described in Patent No. 2,919,432 hereinabove with a steering means producing a suitable magnetic field arranged to effect lateral displacement of the magnetic domains in the magnetic medium with respect to the normal line of propagation of the magnetic domains in the magnetic medium, the normal line being parallel to the easy axis of magnetization, as earlier noted. Such steering means provides a magnetic field directed transversely of the normal line of propagation ideally, but not necessarily, at right angles to the normal line of propagation. As will be described, the strength of the transverse magnetic field is selected to avoid the creation of a new magnetic domain under the circumstances but yet sufficiently strong to introduce a component of movement of the magnetic domain in a direction perpendicular to the normal line of magnetic domain propagation in the magnetic medium. In practice, the transverse magnetic field is applied in combination with the magnetic fields which propagate the magnetic domain along the normal line of propagation to effect lateral displacement of the magnetic domain from the normal line of propagation as the magnetic domain is advanced or propagated. When the transverse magnetic field is applied with the normal propagating fields the magnetic domain is incrementally displaced along the normal line of propagation but occupies a position laterally displaced therefrom. The maximum steering angle is about 30° with present equipment and control voltages and may vary with different electrode arrangements and voltages.

The steering means for providing the transverse magnetic field is conveniently a conducting strip, a conducting layer, or a conducting film, as required by a particular physical organization. A conducting strip controls the direction in which current may flow and results in the production of a magnetic field acting transversely thereof substantially at right angles thereto. However, if a conducting layer or a conducting film is provided the current flow therein will depend largely upon the points at which electrical connections are made thereto, the current tending to take the path of least resistance between such electrical connections through the layer or film. Thus, for a film or a layer, connections may be made in such a way as to induce current flow through the conducting layer or film in a direction approximately paralleling the normal line of propagation in the magnetic medium, whence, a magnetic field acting transversely of the normal line of propagation of the magnetic domains in the magnetic medium is produced.

Other means for obtaining the desired transverse magnetic field may also be used. Such other means include the use of adjacent magnetic domains in the magnetic medium, the use of permanent magnets adjacent the magnetic medium or the use of electromagnets or coils such as Helmholtz coils. The use of a conducting strip, layer or film in an evaporated film device as a steering electrode represents a presently preferred embodiment of this invention. Such a conducting medium is readily manufactured as a part of a vacuum depositing system of magnetic insulating and conducting layers and offers certain size advantages which are desirable.

In practicing this invention there are two requirements, among others, which must be met. The first is the orientation of the magnetic domain in the magnetic medium must not be permanently altered by the transverse magnetic field, otherwise normal propagation will be impaired. The second is the transverse magnetic field acting above or acting in combination with the normal propagating magnetic fields must not create new magnetic domains but must operate only to effect transverse displacement of an existing magnetic domain or domains.

In regard to the first requirement, it is evident that in addition to providing a component of movement of the magnetic domain in a direction perpendicular to the normal direction of propagation a transverse magnetic field will also tend to rotate the magnetic orientation within the domain.

This problem is solved by the present invention in that the magnetic film is provided with anisotrope magnetic characteristics and the film is applied such that the "so-called" easy direction of magnetization parallels the normal line or normal direction of propagation. Thus, if the magnetic domain is poled in correspondence with the easy direction of magnetization and the magnetic orientation within the domain is perturbed by the transverse magnetic field, it has been found that upon removal of the transverse field the magnetic orientation of the magnetic domain snaps back to its initial direction of magnetization which is known to be a lower energy magnetic state.

With regard to the second requirement, the combined field energy applied in moving a domain must be less than that required to create a magnetic domain. The magnetic fields applied for moving the magnetic domain along the normal line of propagation, as stated, must be larger than required to shift or switch a magnetic domain boundary and less than required to create a magnetic domain. If energy is now added by the application of a transverse magnetic field, at best, the margin of safety for the proper functioning of this invention is reduced and, at worst, the resultant energy supplied will be greater than that amount of energy required to create a magnetic domain. This factor limits the magnitude of the transverse magnetic field which may be applied.

In the explanatory material which follows reference may be made to Patent No. 2,919,432 aforesaid for the details of operation of the one dimensional propagating shift register. However, for convenience, certain portions of that reference will be repeated here. In general, propagation of a magnetic zone or area within a magnetic material is achieved by the application of a suitable magnetic field. A magnetic layer or film having the magnetic characteristics described above is employed. This film is initially magnetized in a given direction along the easy direction of magnetization. A magnetic domain or area having a magnetization opposite or antiparallel to that of the remainder of the film is established within the magnetic film. The magnetic domain may be propagated or shifted within the magnetic material by the application of a popagating magnetic field to the leading and trailing boundaries (end walls) of the antiparallel domain to translate the end walls or boundaries.

The energy required to create an antiparallel magnetic domain has been found to include a first portion which is conserved and which is believed to include a quantity called magnetic energy and a quantity called wall energy, and a second portion which is not conserved and is believed to be lost in overcoming the magnetic hysteresis of the material. Since the necessary wall energy has already been supplied to create the magnetic domain it is ideally merely necessary to supply the energy lost as a result of magnetic hysteresis in order to shift the position of the magnetic domain in the material. By translating the domain walls through the application of magnetic fields to the leading and trailing edges of the domain, less energy is required to switch a magnetic domain and thus propagate the magnetic domain than is required to establish the magnetic domain initially.

Investigations have been conducted by others into the magnetic behaviour of ferromagnetic films deposited on substrates. One such investigation is reported in the Journal of Applied Physics, volume 26, August 1955, and is entitled "Preparation of Thin Magnetic Films and Their Properties," by M. S. Blois, Jr., at pages 975 through 980.

Figure 2:
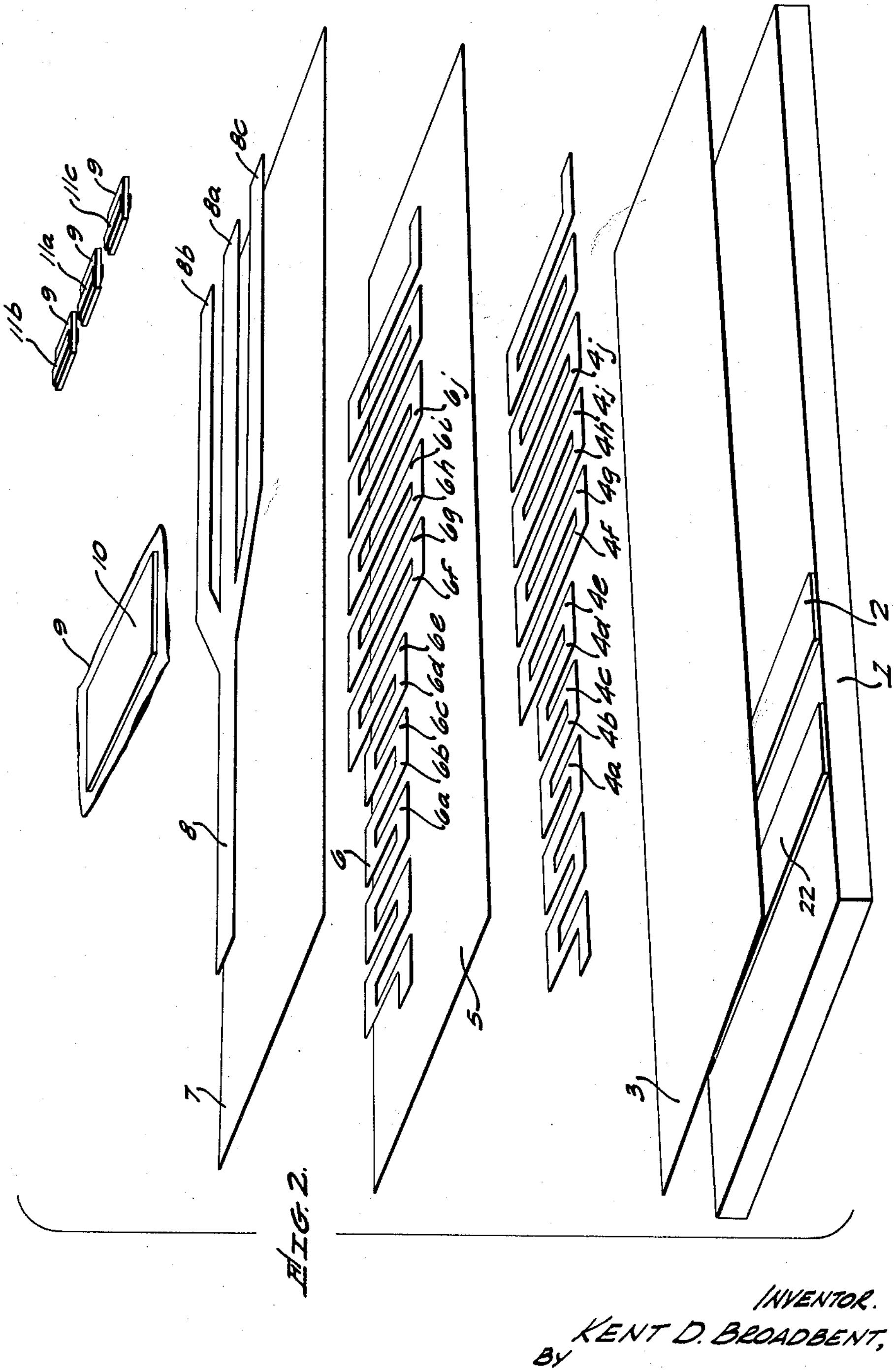
FIG. 2 is an isometric exploded view of the embodiment of the invention illustrated in FIG. 1.

The device shown in FIGS. 1, 2 and 3, which are not drawn to scale, may be manufactured by successive applications of vacuum deposition techniques. Each of the respective magnetic, insulative and conductive layers shown in FIGS. 1, 2 and 3 are superimposed in an appropriate order. The magnetic layer may be composed of permalloy material and have a thickness of approximately 1,000 A. The conductive layers may be composed of aluminum and the insulative layers of silicon monoxide. The thickness of the conductive and insulative layers may each be approximately 10,000 A.

The thickness of the magnetic film layer is governed at the lower field limit by the disappearance of ferromagnetic properties while the appearance of significant eddy-current losses at the relatively high frequencies used, for instance, in digital computing devices, data processors, numerical controls and the like, govern the upper limit of thickness.

Since the entire structure is composed of thin films, a carrier or substrate 1 is required. The choice of a suitable substrate may be made according to the considerations referred to in the before-mentioned Blois article. For the purposes of this invention a suitable substrate has been found to be a commercially available soft glass which is an adequate electrical insulator for this application. However, other insulating materials able to withstand higher temperatures may be used.

Upon the substrate 1 there is deposited a plurality of conducting, insulative and magnetic layers which will be described in detail below. With respect to the various conducting layers it should be pointed out that their order of depositing is not critical and can be varied without impairment of the functioning of the device.

The first layer to be deposited includes one or more suitably spaced write electrodes 2 and 22 of electrical conducting material. These electrodes are of generally rectangular plan form and are used to impress a stable antiparallel magnetic domain in the magnetic layer to be described. An insulating layer 3 is deposited over the write electrodes. The insulating layer 3 must have a size and shape to prevent electrical contact between the write electrodes and the various conducting and magnetic layers which will be superimposed thereupon. A propagating electrode 4 is deposited on insulating layer 3. An insulating layer 5 covers propagating electrode 4. A second propagating electrode 6 is deposited on insulating layer 5. An insulating layer 7 insulates a forked magnetic strip 8, including branches 8*a*, 8*b* and 8*c*, from propagating electrode 6. An insulating layer 9 over magnetic layer 8 receives a steering electrode 10 and read electrodes 11*a*, 11*b* and 11*c* for respective branches 8*a*, 8*b* and 8*c*. A second set of read electrodes 11*d*, 11*e* and 11*f* may be provided nearer the ends of respective branches 8*a*, 8*b* and 8*c* to provide greater delays in sensing a magnetic domain which is being propagated.

The magnetic layer 8 is provided with three branches. The center branch is 8*a* and the two outer branches are 8*b* and 8*c*, respectively. The steering electrode extends completely across the three branches of the magnetic layer and covers the forked area of the magnetic layer so that a magnetic domain in the fork may be selectively transversely biased for displacement into either branch 8*b* or 8*c* as it is propagated, or propagated without transverse bias into the center branch 8*a*.

The propagating electrodes 4 and 6, which are formed of conducting materials, each comprises a plurality of parallel, serially interconnected electrode portions. As will be seen by reference to FIGS. 1 and 2, these propagating electrodes are generally of a zig-zag configuration in plan form. Those parallel electrode portions essential to the description of this invention are identified 4*a*–4*j*, inclusive, and 6*a*–6*j*, inclusive, respectively. The parallel electrode portions extend transversely of the magnetic layer. Each electrode portion extends completely across the magnetic layer, those portions at the branches 9*a*–9*c* extending beyond the outer limits of branches 9*b* and 9*c*. When the propagating electrodes are energized, current in adjacent electrode portions in each flows in opposite directions. The centerlines of adjacent electrode portions correspond approximately to the end walls of a magnetic domain. As illustrated, the propagating electrodes are relatively displaced along the normal line of propagation so that the centerlines of the electrode portions of one propagating electrode are intermediate the centerlines of adjacent electrode portions of the other propagating electrode. The distance between adjacent edges of the electrode portions of each propagating electrode is less than the width of the electrode portions. The widths of the write electrodes 2 and 22 are each sufficient to produce a magnetic zone having end walls spaced in approximate correspondence with the distance between centerlines of adjacent electrode portions of the respective propagating electrodes. Practically, for the size relationships shown,, the widths of write electrodes 2 and 22 may each be about twice the width of an electrode portion of the propagating electrodes. However, other embodiments utilizing the same principles of operation can be made using other electrode configurations.

Although two write electrodes are shown more may be employed to create magnetic zones at the different points, either simultaneously or at different times, as required by particular applications. In the discussions of operation which follow only the write electrode 2 will be referred to in the interest of convenience. Similarly, only the first set of read electrodes 11*a*, 11*b* and 11*c* will be referred to.

Figures 4A, 4B, 4C, 4D, 4E, 4F, 4G, 4H, 4I, 4J:
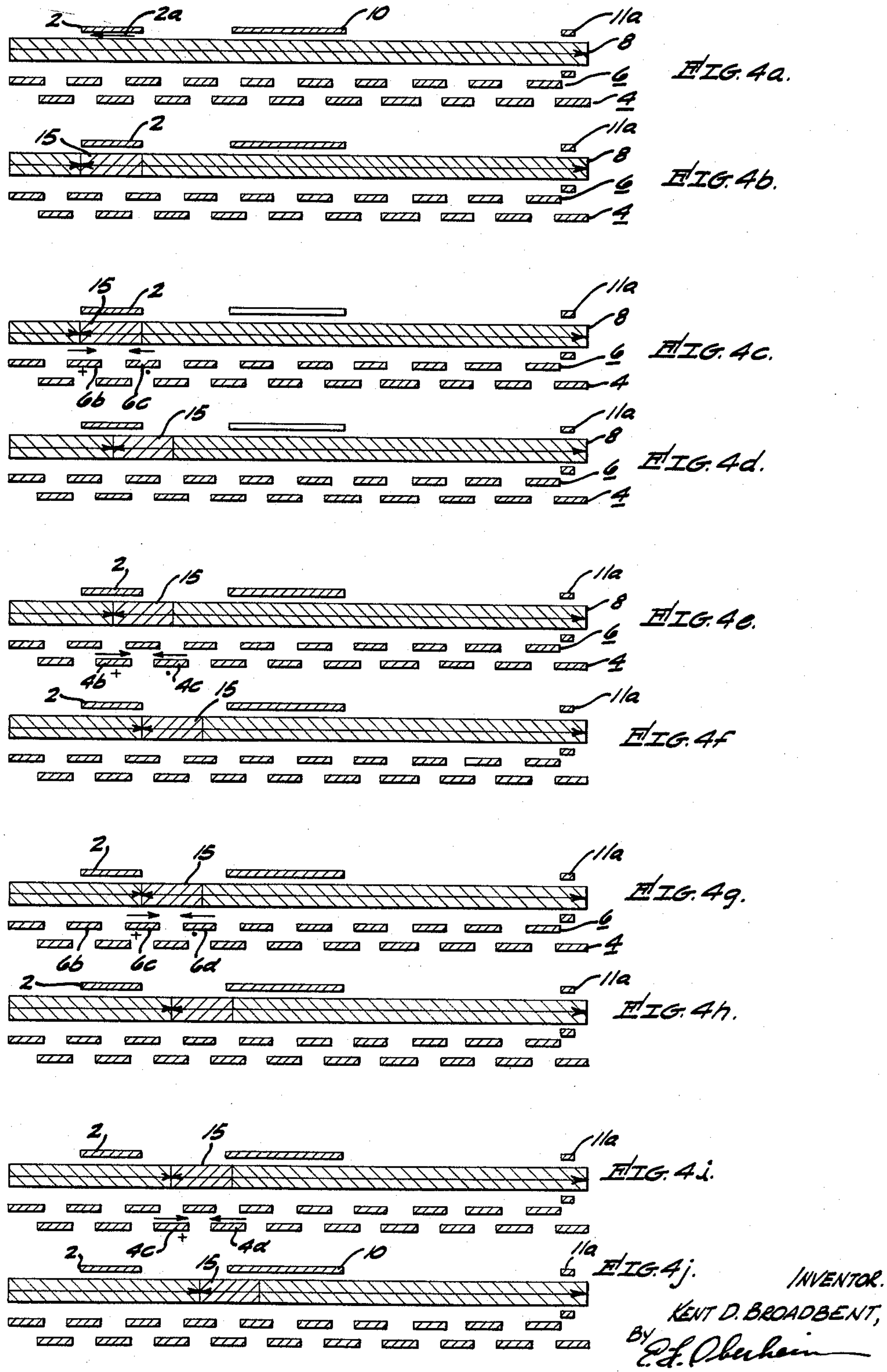

The operation of the device shown in FIGS. 1 through 3 is briefly described below with reference to FIGS. 4*a* through 4*j* which are not to scale. Note that the conductor is shown above the magnetic layer 8 rather than below the layer. This change is merely for the purpose of explanatory convenience and to show a satisfactory alternative arrangement. FIG. 4*a* shows the initial condition of the magnetic layer 8 in which the layer is shown magnetized in a first direction as a single domain, as indicated by the arrow in the layer. Binary information may be represented in the magnetic layer by considering that an area of magnetization of the magnetic layer 8 in the first direction (shown to the right in FIG. 4*a*) denotes a binary "zero" and by considering that an area of magnetization of the magnetic layer 8 in an opposite or antiparallel direction denotes a binary "one."

If it is desired to record binary information in the magnetic layer 8 current is passed through the write electrode 2 causing a magnetic field, represented by arrow 2*a*, to appear around the write electrode which links and magnetizes the adjacent portion of the magnetic layer 8 producing a magnetic domain 15 poled oppositely to the general magnetization of the magnetic layer, as seen in FIG. 4*b*, which, for the convention adopted, represents a binary "one." Since the magnetic layer 8 is magnetized in the "zero" direction it is not necessary to record a "zero."

In FIG. 4*c* propagating electrode 6 has been energized with current of a selected polarity to produce current flow in electrode portion 6*b* into the plane of the paper, as indicated by the plus (+) adjacent thereto, and to produce current flow in electrode portion 6*c* out of the plane of the paper, as indicated by the dot (.) adjacent thereto. The magnetic fields adjacent electrode portions *6b* and *6c* translate the domain end walls to effectively switch or change a length of the trailing edge of the magnetic zone on the left to the same magnetic polarity as that of the magnetic layer and to switch or change a length of magnetic material at the leading edge of the magnetic domain on the right from the magnetic polarity of the magnetic layer to the magnetic polarity of the magnetic domain. On the left the length of magnetic material becomes a part of the "zero" magnetic domain as initially magnetized and on the right the length now magnetically poled in the same sense as magnetic domain 15 combines with the magnetic domain 15 to maintain a stable magnetic domain. The displaced magnetic domain appears in FIG. *4d*.

In FIG. *4e* propagating electrode 4 is energized with current of such a polarity that current flow in the electrode portion *4b* is into the page, as indicated by the plus (+), and into the page in electrode portion *4c*, as indicated by the dot (.). The magnetic fields resulting from the indicated current flows in electrode portions *4b* and *4c* are indicated adjacent thereto as in the case of energization of propagating electrode 6. These magnetic fields are effective in translating the end walls of the magnetic domain to effect displacement thereof another increment to the right to a position indicated in FIG. *4f*.

Further propagation of magnetic domain 15 to the right is achieved, as indicated in FIG. *4g*, by energizing propagating electrode 6 with current of a polarity the reverse of that applied to the propagating electrode 6 in FIG. *4c*. In this circumstance, in FIG. *4g*, current flow in electrode portion *6c* is indicated as going into the plane of the page, and current flow in electrode portion *6d* is indicated as coming out of the plane of the page. The magnetic fields resulting from these current flows in the respective electrode portions indicated are represented by the arrows adjacent the conductors and, as described hereinabove, are effective in translating the end walls of the magnetic domain 15 in such sense as to effect displacement of the magnetic domain an additional increment to the right as indicated in FIG. *4h*.

In FIG. *4i* propagating electrode 4 is energized. In this instance the polarity of the current applied is the reverse of that applied in energizing this propagating electrode, as illustrated in FIG. *4e*. In this instance current flow in electrode portion *4c* is into the plane of the page, and current flow in electrode *4d* is out of the plane of the page to produce the electromagnetic fields resulting from this energization of these electrode portions, as indicated by the arrows adjacent electrode portions *4c* and *4d*. Again, domain wall translation takes place in such sense as to effect domain switching and produce an additional increment of displacement of the magnetic domain 15 to the right, as illustrated in FIG. *4j*.

Note may be made of the fact that in any single propagating electrode the application of an electrode current to its end terminals results in current flows in each of the electrode portions thereof. As noted hereinabove, the field energy for translating domain walls need only be sufficiently great to overcome the magnetic hysteresis of the magnetic material, inasmuch as the energy in establishing the domain, including a portion identified as "wall energy," has been stored in the material. Under these circumstances the strength of the fields adjacent areas of the magnetic layer 8 which are magnetized in the initial direction, that is, the "zero" direction, are not of sufficient strength to create a magnetic domain. While it may be argued that magnetic domains are created by these magnetic fields, there is no evidence, once the electric current has been removed from a propagating electrode, that such domains exist. Hence, if any spurious switching of the magnetic material takes place in areas where such switching is unwanted, no evidence of such switching remains.

The approximate position of steering electrode 10 is represented in each of FIGS. *4a* through 4j. In the discussions concerning the magnetic domain 15 to this point reference has been made only to the selective energization of the propagating electrodes 4 and 6 to effect displacement of the magnetic domain from left to right in the magnetic plane. In the position shown in FIG. *4j* the magnetic domain 15 is just beginning to move beneath the steering electrode 10. The subsequent energization of propagating electrode 6 will be effective to move the magnetic domain beneath the steering electrode 10. A next subsequent energization of propagating electrode 4, in combination with the application of an electrical current to steering electrode 10 of a selected polarity to produce a magnetic field having a component linking the magnetic layer 8 and acting to the left or to the right transversely of the magnetic layer as desired, is now effective to laterally displace the magnetic domain 15 in the magnetic layer 8 as the magnetic domain is propogated to the right as viewed. In the arrangement illustrated effective displacement of the magnetic domain in one lateral step with a corresponding increment of displacement of the magnetic domain to the right is achieved.

By reference to FIGS. 1 and 2 it will be seen that lateral propagation of the magnetic domain within the region of the magnetic field produced by the steering electrode 10 will be effective to translate the magnetic domain in a direction to the left or to the right from the central portion of the magnetic layer to a position aligned for propagation along a normal line of propagation in either of branches *8b* or *8c*, depending upon the direction of the steering magnetic field, whereafter propagation by means of propagating electrodes 4 and 6 may take place independently of the steering electrode 10.

If it is desired to propagate the magnetic domain along the normal line of propagation without lateral displacement the steering electrode 10 is not energized. Consequently, as the magnetic domain 15 is propagated along the magnetic layer it is propagated along the branch *8a* without lateral displacement or translation in the forked section of the magnetic layer.

As noted earlier herein the magnetic layer 8 need not be of a configuration such as that illustrated in FIGS. 1 or 2, but may be a continuous plane generally of the configuration of the substrate 1, for instance. FIG. 5 shows a plan view of such a magnetic layer *8a* having a magnetic domain M magnetized oppositely to the magnetization of the layer *8a*, shown by the large arrow. In this situation the write electrode 2 need only span a selected width of the magnetic material to define a narrow magnetic domain of any desired transverse dimension and having as before a sufficient dimension lengthwise of the magnetic layer, that is, in the direction of propagation, to be magnetically stable. In this situation the propagating electrodes (not shown) in the manner described hereinabove may propagate the magnetic domain M along the normal line of propagation in the magnetic material. The propagating magnetic fields H1 and H2 are shown adjacent the ends of the magnetic domain M and beside it. Any suitable field producing means, such as the steering electrode 10, may be provided at a desired point to apply a steering magnetic field *Hs* of the direction shown or the reverse to the magnetic domain.

One practical arrangement of this latter configuration may include a continuous magnetic film of a permalloy material of approximately 1000 A. thickness. A single domain of information may be written into such a continuous magnetic film at any selected point. As described above, such a magnetic film will be pre-magnetized in a particular direction, the magnetic domain which is written into such a continuous film having a magnetic polarity in opposition to the magnetic polarity of the film. In one practical embodiment such a domain was preserved and propagated along the normal line of propagation, that is, substantially paralleling the direction of magnetization of the magnetic film by the application of suitable propagating magnetic fields as described herein. This domain was also preserved, propagated and steered off at an angle with respect to the normal line of propagation by the application of a steering magnetic field directed transversely or laterally of the normal propagating magnetic field. For the particular embodiment involving the magnetic material identified hereinabove a steering magnetic field of the order of 1 oersted produced an angular displacement of the magnetic domain between a first position and a second further propagated position of approximately 30°.

While the description of propagation of the magnetic domain to this point has inferred unilateral propagation from left to right as viewed in FIGS. 4*a* through 4*j*, it is to be understood that propagation need not take place in this manner. For instance, if lateral translation of any distance is desired of a magnetic domain in a generally rectangular magnetic film, this may be accomplished in a rather limited length of magnetic material by propagating the magnetic domain to the right and to the left, or vice versa, by means of the propagating electrodes within the magnetic field of the steering electrode 10 extending across the magnetic film. By this expedient the magnetic domain may be translated laterally, limited by the maximum angle of steering, over considerable distances without requiring a substantial dimension of the magnetic material in a direction paralleling the normal line of propagation.

In an application of the type illustrated in FIGS. 1 and 2 the divergent branches 8*b* and 8*c* need not be returned to positions paralleling the center strip or center branch 8*a* as illustrated but may diverge any desired distance from a position beneath the steering electrode 10. In such a situation the normal line of propagation may be defined by the direction of the particular branch which may be magnetically oriented so that the direction of magnetization parallels the physical boundaries of the strip or branch. In this situation the propagating electrodes may have portions crossing these diverging branches at substantially right angles thereto.

It will be recalled from the description of the operation of this invention in connection with FIGS. 4*a* through 4*j* that the propagating electrodes 4 and 6 were alternately energized. First, both of these electrodes were energized with current of one polarity in a particular sequence and then, repeating the sequence, both electrodes were energized with current of a reverse polarity, whence the magnetic fields adjacent the end walls of the magnetic domain were of the required direction to switch the end walls and thereby effect movement of the domains in the manner described.

A circuit for accomplishing this mode of operation is illustrated in FIG. 6 and involves a simple flip-flop type of counter including flip-flops FQ1 and FQ2. These may be conventional Eccles-Jordan types of flip-flops, each of which has two input circuits and two output circuits. As illustrated, the input circuits are gauged to be simultaneously energized by the electrical inputs applied thereto. The output circuits in each instance, however, are kept separate and are respectively designated Q1 and $\overline{Q1}$ for the flip-flop FQ1 and Q2 and $\overline{Q2}$ for the flip-flop FQ2. The flip-flop counter provides four electrical configurations and is driven from a suitable clock pulse source, not shown, the output of which, however, is designated CP herein. Clock pulse CP, as illustrated, is applied to both inputs of the flip-flop FQ1. The output Q1 of the flip-flop FQ1 is applied as input to one terminal of an "and" gate, generally designated AG, the other input terminal of which receives the clock pulse CP. The output of "and" gate AG is applied to both input terminals of flip-flop FQ2. By this expedient at any time that the output of flip-flop FQ1 is in its Q1 electrical state, that is, the electrical state in which Q1 is in either its high or low electrical voltage state according to the convention adopted, and a clock pulse CP is applied to the input of the "and" gate AG, a signal is applied to both input terminals of flip-flop FQ2 causing this flip-flop to change its electrical state. The "and" gates may be diode gates, as described in Patent No. 2,803,401.

The configuration of this counter in each of four time intervals is shown in the chart of FIG. 7. If it is assumed that the flip-flop is initially set in its $\overline{Q1}$, $\overline{Q2}$ electrical state, the first clock pulse CP arriving at the input of flip-flop FQ1 will switch this flip-flop from its $\overline{Q1}$ electrical state to its Q1 electrical state. Since the signal Q1 was not in existence on the terminal of the "and" gate AG at the time of the occurrence of the first clock pulse CP the "and" gate AG is not enabled and no signal is transmitted to the input terminals of flip-flop FQ2. Thus, the flip-flop FQ2 remains in its $\overline{Q2}$ electrical state and the counter configuration in time T1, as indicated, is Q1, $\overline{Q2}$ which signals are applied to the two input terminals of an "and" gate A1. The output of gate A1 operates a suitable switch S1, such as a relay or a transistor switch or circuit, which connects a positive current source or current driver 16 to the propagating electrode 6, the other terminal of which is grounded, as shown.

With the occurrence of the next or second clock pulse CP (time T2) the flip-flop FQ1 is switched from its Q1 electrical state to its $\overline{Q1}$ electrical state, as indicated. The simultaneous existence of the signal Q1 and the second clock pulse CP on the input terminals of "and" gate AG results in the application of input to both terminals of flip-flop FQ2 which now changes from its $\overline{Q2}$ electrical state to its Q2 electrical state, as indicated.

The signals $\overline{Q1}$ and Q2 enable an "and" gate A2 which operates a switch S2, similar to switch S1, and connects the positive current driver 16 to propagating electrode 4, the other terminal of which is grounded.

At this point it will be recalled that in describing the propagation of a domain in the magnetic layer 8, propagating electrode 6 was first energized to produce current in electrode portions 6*b* and 6*c* into and out of the plane of the paper, respectively, as illustrated in FIG. 4*c*. The application of positive current from the positive current driver 16 in these explanations with regard to FIG. 6 is of course, arbitrary and depends upon the physical configuration of the propagating electrodes. Hence, either positive or negative current may be used in the appplication as thus far discussed.

With the occurrence of the third clock pulse CP (time T3) flip-flop FQ1 is switched from its $\overline{Q1}$ electrical state to its Q1 electrical state. At the time of occurrence of the third clock pulse CP the signal Q1 does not exist, hence, there is no input to the flip-flop FQ2 and this flip-flop remains in its Q2 electrical state. The signals Q1, Q2 on the input to an "and" gate A3 enable this gate which operates switch S3 connecting a negative current source or driver 17 to the propagating electrode 6; hence, this electrode in begining the second sequence of energization now has current of a reverse polarity applied thereto.

With the occurrence of the fourth clock pulse CP (time T4) both flip-flops FQ1 and FQ2 change electrical state and the electrical configuration is now identified $\overline{Q1}$, $\overline{Q2}$, which is the input to an "and" gate A4 enabling this gate which operates a switch S4, similar to switch S1, connecting the negative current driver 17 to propagating electrode 4 to complete this particular cycle.

With the occurrence of a fifth clock pulse the counter will re-cycle and assume the electrical configuration represented for time T1 in the chart in FIG. 6 and thereafter will continue to cycle in this sequence as long as the clock pulses are applied.

In FIG. 6 a block 18, identified as steering voltage, has output leads connected across suitable terminals on the steering electrode 10. The steering voltage source may be any suitable type of device capable of producing reversible current of the magnitude required for this application and capable also of being switched if necessary. If switching of the steering voltage is employed, the application of steering voltage should be synchronized with the application of the propagating voltages on propagating electrodes 4 and 6. As will be seen in this illustration, the terminals applied to the steering electrode 10 are at diametrically opposite points substantially over a longitudinal centerline of the magnetic layer 8. As such, the magnetic field produced by current flow through this electrode acts laterally of the magnetic layer and the direction of the magnetic field which links the magnetic layer will be dependent upon the direction of current flow between the terminals of the steering electrode. For some applications the steering voltage source, if domain translation in a certain direction is desired, may be applied to the steering electrode prior to the time that propagation of a domain begins. The application of the steering voltage may be before or subsequent to the connection of input voltage from a conventional source 19 to the write electrode 2 for the purpose of creating a magnetic domain. Of course, if the magnetic domain is not to be switched from the normal path of propagation the steering voltage source 18 will not be applied and consequently the magnetic domain will be propagated through the branch *8a* of the magnetic layer. As illustrated, respective readout circuits, also of conventional type, respectively designated R*11a*, R*11b* and R*11c*, and connected to respective readout electrodes *11a*, *11b* and *11c*, are provided to detect the propagation of a magnetic domain in the respective branches *8a*, *8b* or *8c*. While the readout electrodes *11a*, *11b* and *11c* are illustrated in substantially identical longitudinal positions in the respective branches of the magnetic layer, it will be appreciated that these may be disposed at any desirable point therealong, or there may be several such electrodes in displaced positions connected to the same or different readout circuits in each of the several branches shown.

In practice, a succession of magnetic domains may be created in the magnetic layer 8 and propagated in particular directions to selected read electrodes. These magnetic domains may be created by exciting a single write or input electrode, or may be created by exciting suitably spaced write or input electrodes, such as the electrodes 2 and 22. The required spacing between the magnetic domains is approximately equal to the width of a stable magnetic domain.

Although two embodiments of this invention have been illustrated and described it will be appreciated that other physical arrangements, including differing branch arrangements, may be made. Different materials for the insulating, conducting and magnetic materials may be employed. Other uses of the devices may be made than those illustratively suggested. Magnetic domains may be propagated away from the write electrodes and reversed and moved back towards the write electrodes and stepped laterally in forward and reverse sequences of energization of the propagating electrodes in the presence of the steering electrode field. Other modes of operation will be apparent to those skilled in the art.

What is claimed is:

1. A magnetic device, comprising:
a magnetic medium having an initial state of magnetization;
input means magnetically coupled to said magnetic medium at a first predetermined place thereof for establishing in said magnetic medium a magnetic domain of a different state of magnetization than said initial state of magnetization;
output means responsive to the state of magnetization of said magnetic medium at a second predetermined place thereof spaced from said first predetermined place by a continuous portion of said magnetic medium;
magnetic field producing means magnetically coupled to said magnetic medium along said continuous portion thereof for moving said magnetic domain from said first predetermined place to said second predetermined place in a predetermined direction within said continuous portion of said magnetic medium;
and second magnetic field producing means magnetically coupled to said magnetic medium for applying a magnetic force to said magnetic domain at an angle to said predetermined direction of movement.

2. A magnetic device, comprising:
a magnetic medium having an initial state of magnetization;
a write electrode magnetically coupled to said magnetic medium in a first position for creating a magnetic domain in said magnetic medium when said write electrode is energized, having a state of magnetization different from said initial state of magnetization;
propagating electrode means magnetically coupled to said magnetic medium and having portions disposed over said magnetic domain for moving said magnetic domain in a direction paralleling the direction of the initial state of magnetization of said magnetic medium;
a read electrode magnetically coupled to said magnetic medium in the path of movement of said magnetic domain;
and a steering electrode coupled to said magnetic medium in a position intermediate said write and read electrodes for applying a magnetic force to said magnetic domain at an angle to the direction of movement of said magnetic domain by said propagating electrodes.

3. A magnetic device, comprising:
a magnetic medium having an initial direction of magnetization between a pair of opposite edges of said medium;
write electrode means magnetically coupled to said magnetic medium for producing a magnetic domain in said magnetic medium having a direction of magnetization substantially opposite to said initial direction of magnetization;
propagating electrode means magnetically coupled to said magnetic medium and linking said magnetic domain for propagating said magnetic domain in said magnetic medium in a direction paralleling said initial direction of magnetization;
read electrode means coupled to said magnetic medium in the path of propagation of said magnetic domain;
and steering electrode means magnetically coupled to said magnetic medium in a position intermediate said write and read electrodes for applying a magnetic bias to said magnetic domain transversely of the path of propagation of said magnetic domain by said propagating electrode means.

4. A magnetic device, comprising:
a strip of magnetic material magnetized in a direction lengthwise of said strip and having a similarly magnetized branch strip of magnetic material extending therefrom;
write electrode means magnetically coupled to said strip of magnetic material for creating a magnetic domain having a direction of magnetization opposite to that of the direction of magnetization of said strip;
propagating electrode means magnetically coupled to said strip and to said branch strip for propagating said magnetic domain;
read electrodes respectively coupled to said strip and said branch strip in the path of propagation of a magnetic domain in each;
and steering electrode means magnetically coupled to said strip and said branch strip in the region of the junction of said branch strip and said strip for magnetically biasing said magnetic domain in the direction of said branch strip.

5. A magnetic device, comprising:
a magnetic medium having a plurality of branches at a common junction and having an initial direction of magnetization;
write electrode means magnetically coupled to said magnetic medium in a position removed from said branches and said junction for creating a magnetic domain in said magnetic medium magnetically poled in opposition to said initial direction of magnetization;
propagating electrode means magnetically coupled to said magnetic medium including said branches for propagating a magnetic domain from a position in said magnetic medium at said write electrode through said junction into a selected one of said branches;
steering electrode means magnetically coupled to said magnetic medium at least at said junction for applying a magnetic bias to said magnetic domain in a direction transversely of the direction of propagation of said magnetic domain by said propagating electrode means;
and magnetic domain sensing means coupled to said branches.

6. A magnetic device, comprising:
a magnetic medium including a strip and a branch integral with said strip and extending at an angle therefrom, said strip and said branch being initially magnetized in the same sense;
write electrode means magnetically coupled to said strip in a position displaced from the junction of said strip and said branch for creating a magnetic domain in said strip of a magnetic sense opposite to the sense of initial magnetization of said strip and said branch;
propagating electrode means magnetically coupled to said strip and said branch for propagating a magnetic domain from said write electrode means toward said junction;
steering electrode means magnetically coupled to said magnetic medium at least at said junction for applying a magnetic biasing force to said magnetic domain transversely of the direction of propagation of said magnetic domain by said propagating electrode means;
and means coupled to said strip and said branch for sensing a magnetic domain.

7. A magnetic device, comprising;
a magnetic medium having an initial state of magnetization;
input means magnetically coupled to said magnetic medium at a first predetermined place thereof for establishing in said magnetic medium a magnetic domain of a different state of magnetization than said initial state of magnetization;

output means responsive to the state of magnetization of said magnetic medium at a second predetermined place thereof spaced from said first predetermined place by a continuous portion of said magnetic medium;
magnetic field producing means magnetically coupled to said magnetic medium along said continuous portion thereof for moving said magnetic domain from said first predetermined place to said second predetermined place in a predetermined direction within said continuous portion of said magnetic medium;
and second magnetic field producing means magnetically coupled to said magnetic medium in the region of said first named magnetic field producing means for producing a magnetic field coupling said magnetic medium and applying a force to said magnetic domain in a sense to deflect said magnetic domain from said predetermined direction of movement.

8. A magnetic device, comprising:
a magnetic medium having a plurality of branches at a common junction and having an initial direction of magnetization;
write electrode means magnetically coupled to said magnetic medium in a position removed from said branches and said junction for creating a magnetic domain in said magnetic medium magnetically poled in opposition to said initial direction of magnetization;
propagating electrode means magnetically coupled to said magnetic medium including said branches for propagating a magnetic domain from a position in said magnetic medium at said write electrode through said junction into a selected one of said branches;
steering electrode means magnetically coupled to said magnetic medium adjacent said junction for applying a magnetic bias to said magnetic domain in a sense to effect steering during propagation of said magnetic domain into a selected one of said plurality of branches;
and magnetic domain sensing means coupled to said branches.

References Cited by the Examiner

UNITED STATES PATENTS 3,068,453 12/62 Broadbent ------------ 340—174

OTHER REFERENCES

Page 54, November 1960, "Magnetic Steeror," by Studkert.

IRVING L. SRAGOW, *Primary Examiner.*